Patented June 16, 1953

2,642,447

UNITED STATES PATENT OFFICE 2,642,447

PREPARATION OF ORGANOSILICON COMPOUNDS

Edwin P. Plueddemann, Toledo, Ohio, assignor to Libbey-Owens-Ford Glass Company, Toledo, Ohio, a corporation of Ohio No Drawing. Application January 6, 1950, Serial No. 137,271

6 Claims. (Cl. 260—448.2)

1

The invention relates to the production of organosilicon compounds, and more particularly to the production of beta-gamma-alkenylhalosilanes such as methallyltrichlorosilane.

Methallyltrichlorosilane is valuable for the production of synthetic resins, as indicated by United States Patent No. 2,450,594. However, methallyltrichlorosilane heretofore has been very difficult and, therefore, very expensive to produce. When an attempt is made to prepare methallyltrichlorosilane by reacting methallyl magnesium chloride with silicon tetrachloride, the molecules of methallyl magnesium chloride react with one another to produce bimethallyl, in preference to reacting with the silicon tetrachloride, so that any yield of methallyltrichlorosilane is negligible.

The principal object of the invention is the inexpensive production in large yields of beta-gamma-alkenylhalosilanes. More specific objects and advantages are apparent from the description, which illustrates and discloses but is not intended to limit the scope of the invention.

Silicochloroform is known to react with a dimer of isobutylene, but such a reaction heretofore has yielded only an octyltrichlorosilane. For example, when 406 grams of silicochloroform and 224 grams of commercial diisobutylene are reacted by a procedure that is the same as that described in Example 1 below except that heating of the reactor is stopped as soon as the temperature has risen to 275 degrees C., the only product that is obtained is a quantity of 2,4,4-trimethyl-1-pentyltrichlorosilane that is equivalent to about 10 per cent of the diisobutylene employed. The present invention is based upon the discovery that beta-gamma-alkenylhalosilanes can be prepared by the reaction of a silane such as silicochloroform with a poly-isobutylene above a certain temperature, and the further discovery that excellent yields of methallyltrichlorosilane can be obtained thereby.

Since it has been virtually impossible to prepare methallyltrichlorosilane heretofore, the very low cost at which methallyltrichlorosilane can be produced by the present reaction is highly advantageous.

The invention consists in a method of producing organosilicon compounds that comprises preparing a beta-gamma-alkenylhalosilane by reacting (1) a silane whose molecule consists of a silicon atom to which are attached four monovalent radicals consisting of (a) from one to two hydrogens, (b) from one to three halogens each having an atomic weight between 35 and 80, and (c) not more than one radical of the class consisting of phenyl and saturated hydrocarbon

2 radicals having from one to six carbon atoms with (2) a substance having the general formula

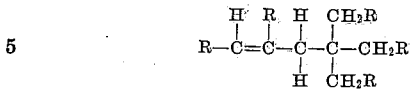

wherein R is of the class consisting of alkyl radicals and H, said substance having not more than sixteen carbon atoms.

A halogen having an atomic weight between 35 and 80 is chlorine or bromine.

The term "saturated hydrocarbon radical" is used herein to mean a straight, branched or closed chain monovalent aliphatic hydrocarbon radical having saturated

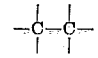

bonds. A saturated hydrocarbon radical having from one to six carbon atoms, which may be attached to a silicon atom in the molecule of a silane used in the practice of the present invention, may be a primary or secondary alkyl radical having from one to six carbon atoms (i. e., methyl, ethyl, propyl, isopropyl, n-butyl, isobutyl, secondary butyl, or any primary or secondary alkyl radical having 5 or 6 carbon atoms); a cycloalkyl radical having 5 or 6 carbon atoms (i. e., cyclopentyl or cyclohexyl).

Silanes as defined in (1) above (hereinafter called "silane reactants") which, or mixtures of which, may be used in the practice of the present invention include: silicochloroform, silicobromoform, dichlorosilane, dibromosilane, methyldichlorosilane, ethyldichlorosilane, propyldichlorosilane, phenyldichlorosilane and methylchlorosilane.

These as well as other silane reactants which may be used in the practice of the present invention may be prepared by reacting, in the presence of aluminum or zinc, silicon tetrachloride or silicon tetrabromide with hydrogen at temperatures between about 350 degrees C. and about 400 degrees C. to obtain products having the general formula

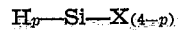

in which X is chloro or bromo and p is an integer from 1 to 2. One halo radical in the molecule of such a silane may then be replaced by a hydrocarbon radical, by means of a Grignard reaction in which each silane molecule is reacted with one Grignard reagent molecule having the general formula D—MgX in which D is a primary or secondary alkyl radical having from one to six carbon atoms (as hereinbefore defined), a cyclopentyl or cyclohexyl radical or a phenyl radical.

The preferred silane reactant in the practice of the invention is silicochloroform, not only because it is inexpensively produced and readily available, but also because it may be used in the preparation of methallyltrichlorosilane by the method of the invention.

An alkyl radical (R) in the molecule of a substance (2) having the general formula given above may be a primary, secondary or tertiary alkyl radical having from one to nine carbon atoms (i. e., methyl, ethyl, propyl, isopropyl, n-butyl, isobutyl, secondary butyl, tertiary butyl, or any primary, secondary or tertiary alkyl radical having from 5 to 9 carbon atoms). For the sake of brevity, a substance (2) having the general formula given above is hereinafter referred to as an "olefinic neo-hydrocarbon." Examples of olefinic neo-hydrocarbons which can be used in the practice of the invention include: 2,4,4-trimethylpentene-1; 2,2,4,6,6-pentamethylheptene-3; 1,1-di(neopentyl)ethylene; 2,4,4,6,6-pentamethylheptene-1; and 4,4-dimethylpentene-1.

In the practice of the invention it is preferred that the olefinic neo-hydrocarbon (as hereinbefore defined) be 2,4,4-trimethylpentene-1, for reasons hereinafter explained. Such a substance may be present in a mixture. For example, commercial diisobutylene, which comprises 80 per cent of 2,4,4-trimethylpentene-1, may be reacted with a silane reactant in the present method. Commercial triisobutylene and commercial tetraisobutylene also comprise olefinic neo-hydrocarbons that can be used in the practice of the invention. Thus, any polyisobutylene not higher than tetraisobutylene may be reacted with a silane reactant such as silicochloroform in the present method.

The only product of the reaction of an olefinic neo-hydrocarbon such as 2,4,4-trimethylpentene-1 with a silane reactant such as silicochloroform at low temperatures is an alkylhalosilane such as an octyltrichlorosilane. Under the reaction conditions of the present method, an olefinic neo-hydrocarbon reacts preferentially in the presence of a silane reactant to give a beta-gamma-alkenyl-halosilane and a tertiary alkane. For example, 2,4,4-trimethylpentene-1 reacts with silicochloroform in the present method to yield methallyltrichlorosilane and isobutane. The reaction may be represented by Equation 1 below:

(1)

$$H_3C-\underset{\underset{CH_3}{|}}{\overset{\overset{H_3C}{|}}{C}}-\underset{\underset{H}{|}}{\overset{\overset{H}{|}}{C}}-\overset{\overset{CH_3}{|}}{C}=CH_2 + SiHCl_3 \longrightarrow$$

$$H_3C-\underset{\underset{CH_3}{|}}{\overset{\overset{CH_3}{|}}{CH}} + H_2C=\overset{\overset{CH_3}{|}}{C}-\underset{\underset{H}{|}}{\overset{\overset{H}{|}}{C}}-SiCl_3$$

Ordinarily, an olefinic neo-hydrocarbon does not decompose at the temperatures used in the present method. However, in the reaction of the present invention (e. g., as represented by Equation 1 above), the presence of a silane reactant such as silicochloroform causes rupture of the bond between a tertiary carbon atom and a carbon atom that is connected by a single bond to a doubly-bonded carbon atom

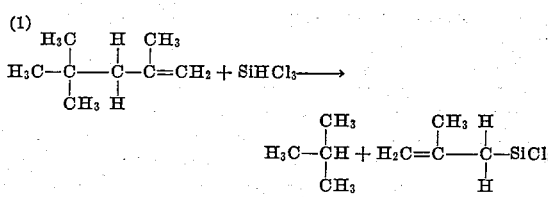

to give the beta-gamma-alkenyl radicals which are present in the beta-gamma-alkenylhalosilane that is produced. Although it is not intended to limit the reaction of the present invention to any particular mechanism, this rupture of the —C—C— bonds is believed to take place at the time of the reaction with the silane, because the alkylhalosilanes, once they have been formed by the simple addition of a molecule of a silane reactant such as silicochloroform to a molecule of an olefinic neo-hydrocarbon, have been found to be quite stable at the temperatures in question. However, it is possible that such an alkylhalosilane may be in an unstable condition at the instant when it is formed, so that at that instant it is capable of decomposing at the reaction temperature to produce a beta-gamma-alkenylhalosilane. (The position of a carbon atom that is connected to a silicon atom in the molecule of an organosilane is considered herein to be the alpha position, so that the position of a carbon atom adjacet the carbon atom that is connected to a silicon atom in the molecule of an organosilane is the beta-position. Thus, the term "beta-gamma-alkenyltrichlorosilane" as used herein refers to compounds having the following structural formula:

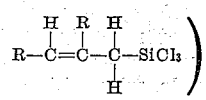

Hydrocarbon starting materials which may be used in the present method are not limited to olefinic neo-hydrocarbons, as hereinbefore defined, and mixtures thereof. For example, any olefinic hydrocarbon whose molecule under the present reaction conditions is rearranged to the molecular structure of an olefinic neo-hydrocarbon may be used in the practice of the present invention. Furthermore, an olefinic neo-hydrocarbon may react with a silane reactant in the present method to yield a beta-gamma-alkenylhalosilane which contains a tertiary carbon atom connected to a carbon atom which in turn is connected by a single bond to a doubly-bonded carbon atom. Such a beta-gamma-alkenylhalosilane may then undergo a reaction with a silane, similar to that by which it was formed. For example, the reaction between silicochloroform and an olefinic substance such as 1,1-di(neopentyl)ethylene in the present method may be represented by Equations 2 and 3 below:

(2)

$$H_3C-\underset{\underset{CH_3}{|}}{\overset{\overset{CH_3}{|}}{C}}-\underset{\underset{H}{|}}{\overset{\overset{H}{|}}{C}}-\overset{\overset{CH_2}{||}}{C}-\underset{\underset{H}{|}}{\overset{\overset{H}{|}}{C}}-\overset{\overset{CH_3}{|}}{\underset{\underset{CH_3}{|}}{C}}-CH_3 + SiHCl_3 \longrightarrow$$

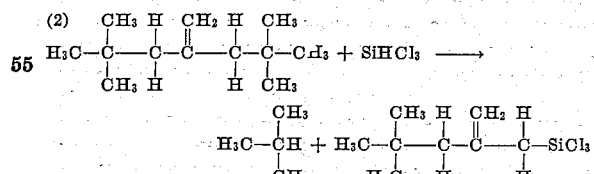

(3)

$$H_3C-\underset{\underset{CH_3}{|}}{\overset{\overset{CH_3}{|}}{C}}-\underset{\underset{H}{|}}{\overset{\overset{H}{|}}{C}}-\overset{\overset{CH_2}{||}}{C}-\underset{\underset{H}{|}}{\overset{\overset{H}{|}}{C}}-SiCl_3 + SiHCl_3 \longrightarrow$$

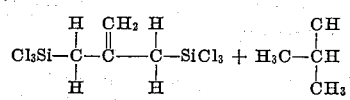

The preferred beta-gamma-alkenylhalosilanes prepared by the present method are beta-gamma-alkenyltrichlorosilanes, the most important of which is methallyltrichlorosilane. Although methallyltrichlorosilane can be obtained in the present method by the reaction of silicochloroform with, for example, triisobutylene, which comprises 2,4,4,6,6-pentamethylheptene-1, it is most economically obtained by reacting silicochloroform with diisobutylene, which comprises 2,4,4-trimethylpentene-1. The higher the polymer of isobutylene that is used in the present method, the more complex the reaction mixture becomes, and the more difficult it is to separate pure beta-gamma-alkenyltrichlorosilane products such as methallyltrichlorosilane. Furthermore, since ordinarily only one molecule of methallyltrichlorosilane can be obtained from one molecule of an olefinic neo-hydrocarbon, the use of triisobutylene or tetraisobutylene in the preparation of methallyltrichlorosilane is unnecessarily expensive.

When a mixture of 2,4,4-trimethylpentene-1 and silicochloroform is heated, the 2,4,4-trimethylpentene-1 is likely to be used up by the reaction which produces octyltrichlorosilanes before a temperature is reached at which methallyltrichlorosilane is formed by the method of the invention. Thus, in order to carry out the reaction by which a beta-gamma-alkenylhalosilane is formed, it is necessary to get the reaction started before one of the reactants is completely used up by the formation of alkylhalosilanes. In the practice of the present invention the temperature at which the desired reaction takes place should be attained before either of the reactants is completely used up.

In the practice of the invention the reactants may be brought to the reaction temperature before one of the reactants is used up by introducing a stream of the reactants into a relatively large reactor maintained at the reaction temperature. Alternatively, a stream of the reactants may be passed rapidly through a relatively narrow heating tube before entering the reactor.

The reaction zone in the present invention may comprise a stationary reactor which is heated by any method ordinarily employed (e. g., by electrically heated coils, by a molten salt bath or by flue gases). The reaction is conducted as a continuous operation by passing the reactants into the reactor, allowing the reaction to proceed to substantial completion, cooling the products by means of a condenser connected to the reactor, and separating the products by fractional distillation. It is desirable in all instances to avoid the introduction of air, containing moisture, which hydrolyzes the silanes present in the reactor to produce hydrogen chloride.

Ordinarily no beta-gamma-alkenylhalosilane can be produced at a temperature below 275 degrees C. It is usually preferable that the reaction temperature be at least 300 degrees C. and it is most desirable that it be at least 315 degrees C. Although the reaction temperature may be as high as 400 degrees C., it is preferable that it be below 350 degrees C., and it is most desirable that it be below 330 degrees C.

The reactants must reach the reaction temperature before one of the reactants is used up (e. g., by the formation of alkyltrichlorosilanes such as octyltrichlorosilanes). Very little reaction takes place before the reactants reach a temperature of 200 degrees C. so that the rate of heating is not critical until that temperature is reached. Although some conversion of an olefinic neo-hydrocarbon to a beta-gamma-alkenylhalosilane can still be obtained after the reactants have been heated from 200 degrees C. to 275 degrees C. over a period of time as long as five hours, ordinarily it is preferable that the mixture of olefinic neo-hydrocarbon and silane reactant pass through that temperature range in considerably less time than five hours. Thus, it is preferable that the mixture be heated from 200 degrees C. to 275 degrees C. within a period not longer than one hour, and most desirable that this period be not longer than one minute.

Ordinarily, in the preparation of beta-gamma-alkenylhalosilanes there is no practical reason for using a reaction time of more than about four hours. ("Reaction time" is used herein to mean the average time required for a volume of reactants (calculated at the reaction temperature and pressure) equal to the volume of the reaction zone to pass into a continuous reactor.) Usually it is preferable that the reaction time be not longer than two hours, and it is most desirable that it be not longer than one hour. Although the reaction time may be as short as one minute, it is preferable that it be at least five minutes, and it is most desirable that it be at least ten minutes.

Although the present reaction may be conducted at atmospheric pressure by passing the mixture of silane reactant and olefinic neo-hydrocarbon through a heated zone, it is usually preferable to conduct the reaction at superatmospheric pressure so that reasonable quantities of the reactants in the proper molal ratios can be reacted within a given time without the use of an extremely large reactor. It is ordinarily not practical to conduct the reaction at a pressure lower than about 200 pounds per square inch gauge at the reaction temperature or higher than about 2000 pounds per square inch gauge. It is preferable that the pressure at the reaction temperature be at least about 600 pounds per square inch gauge and most desirable that it be at least about 1000 pounds per square inch gauge. Usually it is preferable that the pressure at the reaction temperature be not higher than about 1800 pounds per square inch gauge, and most desirable that it be not higher than about 1500 pounds per square inch gauge.

In the present method, when an excess of silane reactant such as silicochloroform over olefinic neo-hydrocarbon is employed a larger conversion of the olefinic substance to a beta-gamma-alkenylhalosilane results than when equivalent proportions are used. Thus, it is preferable that the molar ratio of a silane reactant such as silicochloroform to olefinic neo-hydrocarbon be greater than 1:1; for example, at least 1.5:1 and desirably at least 2:1. Although the molar ratio may be as high as 10:1, usually it is preferable in the preparation of a beta-gamma-alkenylhalosilane that it be not higher than 6:1, and most desirable that the molar ratio be not higher than 4:1.

Although the foregoing discussion of the conditions for carrying out the present reaction has referred to a continuous process, the present reaction may also be carried out as a batch process (e. g., by introducing the reactants into a steel high pressure bomb placed in a heating jacket). The considerations that apply to such a batch process are the same as those that govern the operating temperature ranges, rates of heating, proportions of reactants and pressure in a continuous operation.

*Example 1*

A mixture of 2,4,4-trimethylpentene-1 (89.6 grams), 2,4,4-trimethylpentene-2 (22.4 grams), and silicochloroform (270.8 grams) is placed in an Aminco rocking bomb at room temperature.

(An Aminco rocking bomb is a reaction vessel which consists of a stainless steel cylindrical cup having an inside diameter of 3 5/16 inches, an outside diameter of 4 3/8 inches, and an inside depth of 21 inches, fitted with a pressure head that is held against the top of the cup by bolts and is sealed with a lead or copper gasket. The pressure head contains a thermowell extending into the cup, and a threaded opening for connecting a high pressure valve leading to a pressure gauge or vent. The assembled reaction vessel is positioned horizontally in an electrical heating jacket and is rocked by a motor-driven mechanism through an arc of about 30 degrees at a rate of 58 cycles per minute.) The bomb is sealed and heated to a temperature of about 300 degrees C. in approximately 75 minutes. The heating is then continued for an additional three hours at temperatures ranging between 300 and 340 degrees C., and the pressure inside the reactor reaches about 1500 pounds per square inch gauge. At the end of this period the heating is discontinued, the bomb is cooled to a temperature of about 20 degrees C., and the product is removed and separated by fractional distillation through a jacketed glass column 36 inches in length, packed with single-turn glass helices, and having a variable reflux head. At the beginning of the fractional distillation the material in the still is heated slowly until the temperature at the top of the column reaches approximately 140 degrees C. The material which is collected in the condenser during this heating process is designated as the "forerun," and consists substantially of unreacted silicochloroform, with small quantities of diisobutylene and some hydrocarbon gases. The following materials are recovered after collecting the forerun: methallyltrichlorosilane (45 grams), B. P. 140 to 150 degrees C. at 740 mm. Hg (i. e., boiling within the range between 140 and 150 degrees C. at an absolute pressure of 740 mm. of mercury), specific gravity, i. e., density at 28 degrees C. compared with that of water at 4 degrees C. ($d_4^{28}$) 1.185, index of refraction at 17 degrees C. ($n_D^{17}$) 1.450; a fraction (21 grams) boiling within a range of 190 to 212 degrees C. at 740 mm. Hg, which comprises primarily 2,4,4-trimethyl-1-pentyltrichlorosilane; a fraction (158 grams) boiling within a range of 212 to 235 degrees C., which comprises predominantly 2,4,4-trimethyl-3-pentyltrichlorosilane (derived from addition reaction of silicochloroform with 2,4,4-trimethylpentene-2), B. P. 220 to 225 degrees C., $d_4^{28}$ 1.237, $n_D^{27}$ 1.461; and a fraction (15 grams) which contains no tar and which boils within a range of 236 to 265 degrees C.

The procedure described in the preceding paragraph may be carried out using in place of the silicochloroform an equivalent amount (2 mols) of silicobromoform, dichlorosilane, dibromosilane, methyldichlorosilane, ethyldichlorosilane, propyldichlorosilane, phenyldichlorosilane or methylchlorosilane.

*Example 2*

Using the apparatus described in Example 1, a mixture of 2,4,4-trimethylpentene-1 (179.2 grams), 2,4,4-trimethylpentene-2 (44.8 grams) and silicochloroform (306 grams) is heated to 300 degrees C. in approximately 75 minutes. The heating is then continued for an additional three hours at temperatures ranging between 300 and 320 degrees C. At the end of this period the bomb is cooled to a temperature of about 20 degrees C. and the product is removed and separated by fractional distillation through a vacuum-jacketed glass column 36 inches in length having a Dry-Ice cooled reflux head. The forerun (i. e., materials boiling in a range up to about 140 degrees C.) comprises a mixture of saturated and unsaturated hydrocarbons believed to have from two to four carbon atoms, boiling at temperatures ranging from −30 to −6 degrees C. at 740 mm. Hg; silicochloroform (60 grams); and diisobutylene (24 grams). The following materials are recovered after collecting the forerun: a fraction (190 grams) boiling within a range of 140 to 150 degrees C. at 740 mm. Hg, which comprises a mixture of organotrichlorosilanes of which 30 per cent by weight shows unsaturation and is methallyltrichlorosilane (the saturated material, because of the similarity of boiling range, probably consisting of silanes having approximately the same molecular weight, mainly isobutyltrichlorosilane); a fraction (87 grams) boiling within a range of 165 to 200 degrees C. at 740 mm. Hg, which is believed to comprise a mixture of hexyl- and heptyltrichlorosilanes (probably formed by decomposition of the diisobutylene starting materials to numerous fragments which react with silicochloroform); and a fraction (120 grams) boiling within a range of 200 to 220 degrees C. at 740 mm. Hg, which comprises a mixture of 2,4,4-trimethyl-1-pentyltrichlorosilane and 2,4,4-trimethyl-3-pentyltrichlorosilane.

*Example 3*

A mixture of silicochloroform (810 grams) and triisobutylene (336 grams of commercial triisobutylene, which consists of isomers in approximately the following percentage composition: 2,2,4,6,6-pentamethylheptene-3, 50 per cent; 1,1-di(neopentyl)-ethylene, 40 per cent; 2,4,4,6,6-pentamethylheptene-1, 5 per cent; and 2,4,4,6,6-pentamethylheptene-2, 5 per cent) is charged into the bomb described in Example 1. The bomb is sealed and heated to a temperature of about 300 degrees C. in approximately 1 hour. The heating is continued four hours longer at temperatures ranging between 340 and 350 degrees C. The pressure inside the reactor during this period reaches about 1500 pounds per square inch gauge. The heating is then discontinued, and the bomb is cooled to a temperature of about 20 degrees C. The product is removed and separated by fractional distillation through a jacketed glass column 36 inches in length, packed with single-turn glass helices and having a variable reflux head. The forerun (i. e., material boiling in a range up to about 140 degrees C.) comprises a mixture of low-boiling hydrocarbons consisting mainly of isobutane, silicochloroform (125 grams) and a mixture of hydrocarbons boiling at temperatures ranging between 50 and 140 degrees C., believed to include diisobutylene and octanes. The following materials are recovered after collecting the forerun: a fraction (195 grams) boiling within a range of 140 to 145 degrees C. at 740 mm. Hg, $d_4^{25}$ 1.17, which comprises a mixture of organotrichlorosilanes of which 30 per cent by weight shows unsaturation and is methallyltrichlorosilane (the saturated material is believed to consist mainly of isobutyltrichlorosilane); a fraction (100 grams) boiling within a range of 145 to 205 degrees C. at 740 mm. Hg which is believed to comprise a mixture of pentyl-, hexyl- and heptyltrichlorosilanes; a fraction (310 grams) boiling within a range of 100 to 150 degrees C. at 20 mm. Hg, which is a mixture comprising octyltrichlorosilanes; and a fraction (40 grams) boiling within a range of 150 to 180 degrees C. at 20 mm. Hg, which is believed to contain some dodecyltrichlorosilanes.

*Example 4*

A mixture of silicochloroform (675 grams) and tetramers of isobutylene (730 grams of commercial tetraisobutylene, the exact composition of which is unknown, but which is believed to consist mainly of isomers of heptamethylnonene) is heated to a temperature of about 300 degrees C. using the apparatus and procedure described in Example 3. The heating is then continued for two hours longer at temperatures ranging between 300 and 330 degrees C. The pressure inside the reactor during this period reaches about 1500 pounds per square inch gauge. The heating is then discontinued, and the bomb is cooled to a temperature of about 20 degrees C. The product is removed and separated by fractional distillation through a jacketed glass column 36 inches in length, packed with single-turn glass helices and having a variable reflux head. The forerun (distilled at temperatures up to about 135 degrees C.) comprises a very small amount of silicochloroform, a larger amount of a mixture of low boiling hydrocarbons, and a mixture of saturated and unsaturated hydrocarbons (250 grams) boiling at temperatures ranging between 97 and 101 degrees C. at 740 mm. Hg, believed to consist mainly of octanes with some diisobutylene. The following materials are recovered after collecting the forerun: a fraction (100 grams) boiling within a range of 135 to 150 degrees C. at 740 mm. Hg which consists of a mixture of methallyltrichlorosilane and isobutyltrichlorosilane; a fraction (70 grams) boiling within a range of 190 to 215 degrees C. at 740 mm. Hg which contains a mixture of octyltrichlorosilanes; a fraction (425 grams) boiling within a range of 120 to 145 degrees C. at 30 mm. Hg which is believed to comprise a mixture of octyltrichlorosilanes; and a fraction (75 grams) boiling within a range of 145 to 180 degrees C. at 30 mm. Hg which is a mixture comprising mainly alkyltrichlorosilanes, which are believed to include dodecyltrichlorosilanes.

I claim:
1. A method that comprises preparing a beta-gamma-alkenylhalosilane by reacting at a temperature from 275° C. to 400° C. (1) a silane whose molecule consists of a silicon atom to which are attached four monovalent radicals consisting of (a) from one to two hydrogens, (b) from one to three halogens each having an atomic weight between 35 and 80, and (c) not more than one radical of the class consisting of phenyl and saturated hydrocarbon radicals having from one to six carbon atoms with (2) a substance having the general formula

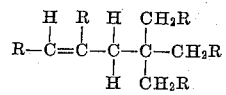

wherein R is of the class consisting of alkyl radicals and H, said substance having not more than sixteen carbon atoms.

2. A method as claimed in claim 1 wherein the silane is silicochloroform.

3. A method as claimed in claim 2 wherein an excess of silicochloroform is present.

4. A method as claimed in claim 3 that comprises preparing a beta - gamma - alkenyltrichlorosilane by reacting silicochloroform with a polyisobutylene not higher than tetraisobutylene.

5. A method as claimed in claim 4 wherein the polyisobutylene is diisobutylene.

6. A method that comprises preparing methallyltrichlorosilane by reacting silicochloroform with 2,4,4-trimethylpentene-1 at a temperature from 275° C. to 400° C.

EDWIN P. PLUEDDEMANN.

References Cited in the file of this patent

UNITED STATES PATENTS

| Number | Name | Date |
|---|---|---|
| 2,379,821 | Miller | July 3, 1945 |
| 2,510,853 | Barry et al. | June 6, 1950 |
| 2,524,529 | Krieble | Oct. 3, 1950 |